(12) United States Patent
Chao et al.

(10) Patent No.: US 8,891,738 B2
(45) Date of Patent: Nov. 18, 2014

(54) METHOD OF PROCESSING TELEPHONE VOICE OUTPUT, SOFTWARE PRODUCT PROCESSING TELEPHONE SOUND, AND ELECTRONIC DEVICE WITH TELEPHONE FUNCTION

(71) Applicant: Kuo-Ping Yang, Taipei (TW)

(72) Inventors: Kuan-Li Chao, Taipei (TW); Neo Bob Chih-Yung Young, Taipei (TW); Jing-Wei Li, Taipei (TW); Vincent Shuang-Pung Liaw, Taipei (TW); Yun-Da Hsieh, Taipei (TW); Kuo-Ping Yang, Taipei (TW)

(73) Assignee: Kuo-Ping Yang, Taipei (TW)

( * ) Notice: Subject to any disclaimer, the term of this patent is extended or adjusted under 35 U.S.C. 154(b) by 0 days.

(21) Appl. No.: 14/081,227

(22) Filed: Nov. 15, 2013

(65) Prior Publication Data
US 2014/0286480 A1    Sep. 25, 2014

(30) Foreign Application Priority Data

Mar. 20, 2013  (TW) .............................. 102109923 U

(51) Int. Cl.
*H04M 11/00* (2006.01)
*H04M 3/42* (2006.01)

(52) U.S. Cl.
CPC ...... *H04M 3/42391* (2013.01); *H04M 3/42042* (2013.01)
USPC .......................................... 379/52; 379/88.19

(58) Field of Classification Search
USPC .................................................. 379/52, 88.19
See application file for complete search history.

(56) References Cited

U.S. PATENT DOCUMENTS

| | | | |
|---|---|---|---|
| 2008/0177539 A1* | 7/2008 | Huang et al. | 704/246 |
| 2013/0102362 A1* | 4/2013 | Inagaki | 455/563 |
| 2014/0003298 A1* | 1/2014 | Charugundla | 370/259 |

* cited by examiner

*Primary Examiner* — Creighton Smith
(74) *Attorney, Agent, or Firm* — Bacon & Thomas, PLLC

(57) ABSTRACT

A method of processing telephone voice output is applied in an electronic device with telephone function. When any one of the two communicators is a hearing-impaired user, at least one of the electronic devices will obtain the corresponding voice adjustment parameters according to the receiver identification of the hearing-impaired user. Therefore, the voice adjusting program is able to process the voice in advance based on the voice adjustment parameters to help the hearing-impaired user hear better.

6 Claims, 5 Drawing Sheets

METHOD OF PROCESSING TELEPHONE VOICE OUTPUT, SOFTWARE PRODUCT PROCESSING TELEPHONE SOUND, AND ELECTRONIC DEVICE WITH TELEPHONE FUNCTION

BACKGROUND OF THE INVENTION

1. Field of the Invention

The present invention relates to a technology for allowing hearing-impaired people to distinguish a caller/receiver's voice clearly in telephone conversations.

2. Description of the Related Art

Hearing-impaired people are people who, without the help of hearing aids, are unable to hear, or encounter difficulties with hearing, high-frequency sounds. People with mild hearing-impairment are unable to hear sounds over 6000 Hz. People with severe hearing impairment are unable to hear sounds over 2000 Hz. For these people, sounds of frequencies higher than 4000 Hz cannot be heard even if the sound has been amplified. Since the frequencies of many consonants are higher than 4000 Hz, hearing aids are applied to compress the frequency of the sounds and amplify the sounds for hearing-impaired people. Hearing aids are designed to allow hearing-impaired people to set some sound modification parameters according to their individual audiograms. These sound modification parameters often involve frequency adjustment and sound amplification performed by a modification processing program, in the form of software or firmware, in the hearing aid.

When hearing-impaired people have a face-to-face conversation with other people, the hearing-impaired people can hear high-frequency sounds because those high-frequency sounds are compressed or shifted by their hearing aids. However, during telephone conversations, hearing-impaired people cannot distinguish sounds properly, especially sounds with consonants and short sounds, such as "sit" and monosyllabic words (words with only one vowel sound). This is particularly problematic during telephone conversations conveyed by a landline because high-frequency sounds are removed by the landline telephone before transmission. No sounds with frequencies higher than 4000 Hz are transmitted to the hearing-impaired people.

Some Internet phones remove high-frequency sounds as well; thus, the same problem mentioned above occurs when hearing-impaired people talk with others through Internet phones.

To sum up, hearing-impaired people need help when they are talking on the telephone, and especially on landline telephones.

SUMMARY OF THE INVENTION

The main object of the present invention is to provide an electronic device with a telephone function and a method for allowing hearing-impaired people to clearly distinguish a caller's/receiver's voice in telephone conversations.

In order to achieve the above object, an electronic device with a telephone function used by a caller or a receiver comprises a processor, a memory, a microphone module, a speaker, and a voice signal communication module. A communication software and a voice modification processing program are stored in the memory. According to one embodiment of the present invention, a voice modification parameter database can be optionally selected for storage in the memory.

For example, when a caller makes a phone call to a receiver who is a hearing-impaired person through an electronic device with telephone function of the present invention, a voice modification parameter corresponding to the receiver is obtained according to a receiver's caller ID information. Therefore, a voice of the caller is modified based on the voice modification parameter stored in the voice modification processing program in the electronic device with telephone function. After the caller's voice has been modified, e.g., after the caller's voice is modified below 4000 Hz, the caller's voice is transmitted to the electronic device with telephone function of the hearing-impaired person. Thus, the hearing-impaired person can hear the voice with its original frequencies higher than 4000 Hz after voice modification.

Also, when the caller is the hearing-impaired person, a voice modification parameter corresponding to the caller is obtained according to the caller's caller ID information, such that the receiver's voice is modified firstly and then transmitted to the electronic device with telephone function of the caller (the hearing-impaired person).

Whether the caller or the receiver is the hearing-impaired person, the voice modification parameter is obtained according to the hearing-impaired person's caller ID information; therefore, the voice can be modified by the voice modification processing program in the electronic device with telephone function in advance for allowing the hearing-impaired people to hear the voice clearly.

According to one embodiment, the voice modification parameter can be downloaded from a voice modification parameter service server via the Internet in real time, or the voice modification parameter can be also stored in the hearing-impaired people's electronic device with telephone function in advance.

BRIEF DESCRIPTION OF THE DRAWINGS

The exemplary embodiment of the present invention will be understood more fully from the detailed description given below and from the accompanying drawings of the invention, which, however, should not be taken to limit the invention to the specific embodiment, but are for explanation and understanding only.

DETAILED DESCRIPTION OF THE PREFERRED EMBODIMENT

To facilitate understanding and to clarify the object, characteristics and advantages of the present invention, the following specific embodiment and figures illustrating the present invention are presented to provide a detailed description.

Figure 1:
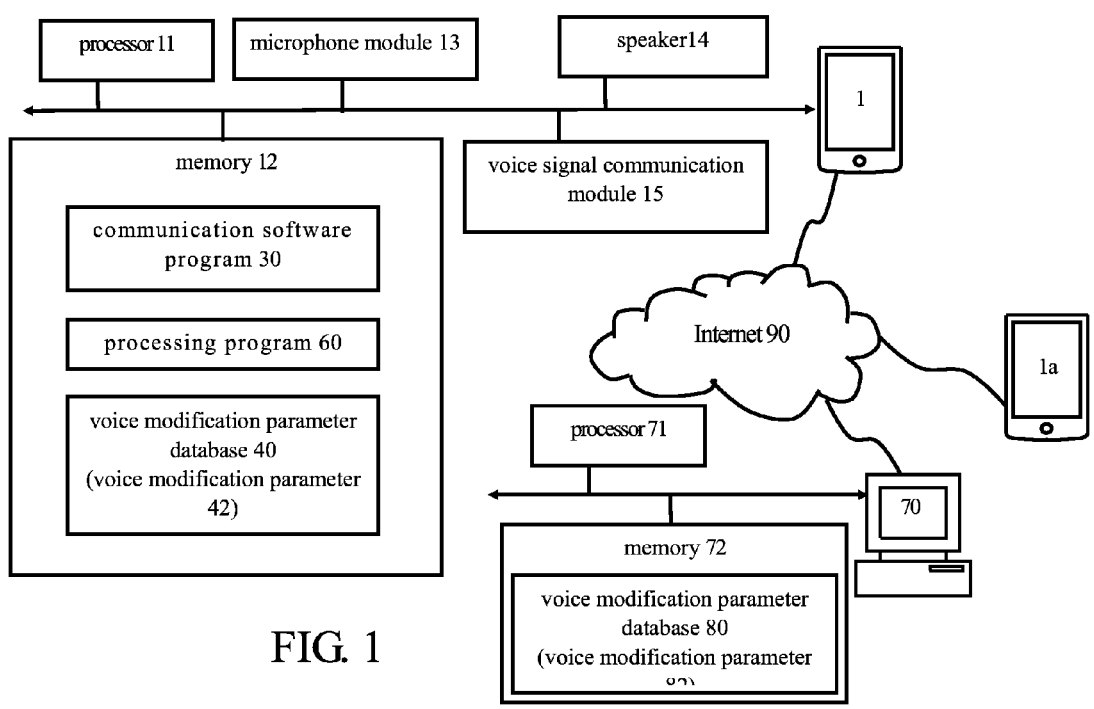
FIG. 1 is a schematic drawing of the environment according to the present invention.

Please refer to FIG. 1, which is a schematic drawing of the environment according to the present invention. A caller makes a phone call to a receiver through an electronic device with telephone function 1, and the receiver receives the call on an electronic device with telephone function 1a. The electronic devices with telephone function 1, 1a can be a cell phone, a PC (Internet phone), a walkie-talkie, etc. In addition, the electronic device with telephone function 1a can also be a landline telephone. In this embodiment, the receiver is a person who has hearing difficulties such as a hearing-impaired person or an elderly person.

The electronic device with telephone function 1 comprises a processor 11, a memory 12, a microphone module 13, a speaker 14, and a voice signal communication module 15. The memory 12 stores a communication software 30, a voice modification processing program 60, and a voice modification parameter database 40. The memory 12, the microphone module 13, the speaker 14, and the voice signal communication module 15 are electrically connected to the processor 11.

The voice modification parameter service server 70 further comprises a processor 71 and a memory 72. The memory 72 stores a voice modification parameter database 80.

Figure 2:
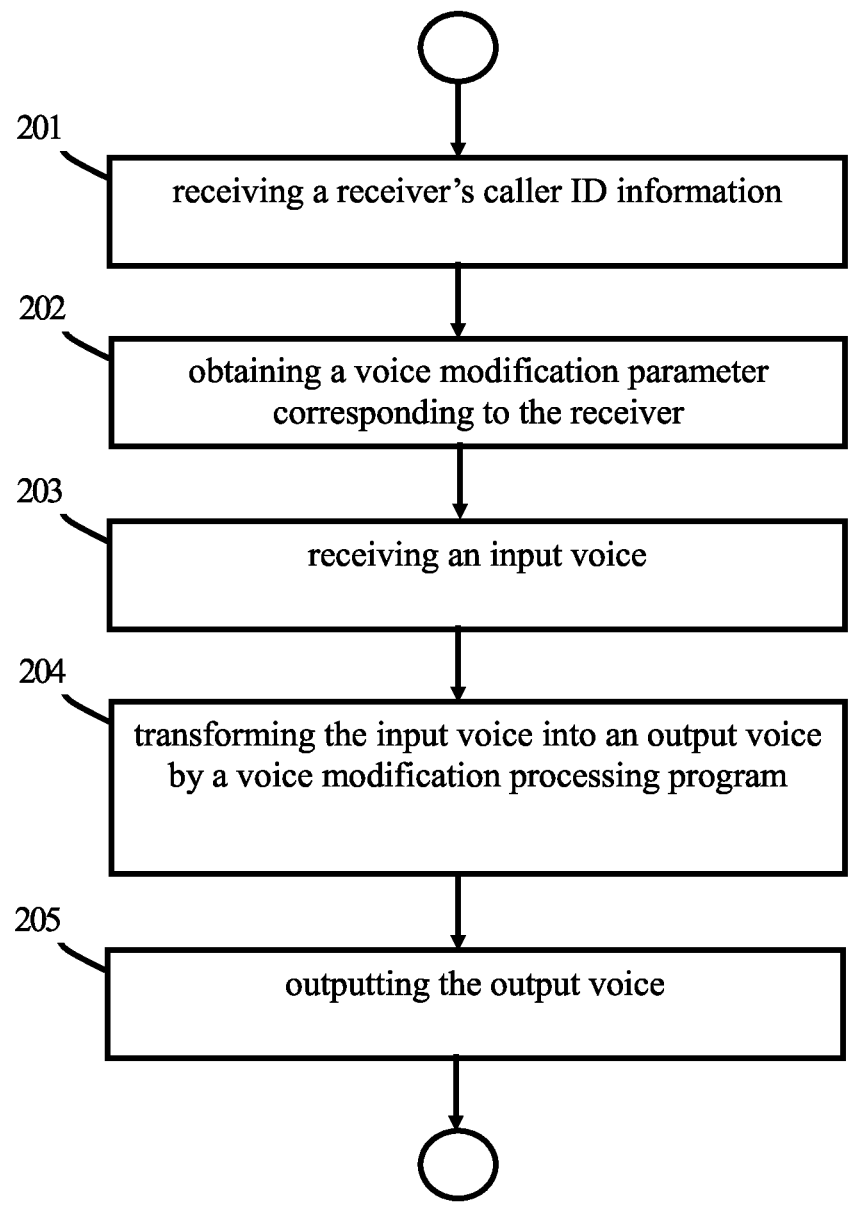
FIG. 2 is a flow chart according to the present invention, wherein the receiver is a hearing-impaired person.
Figure 3:
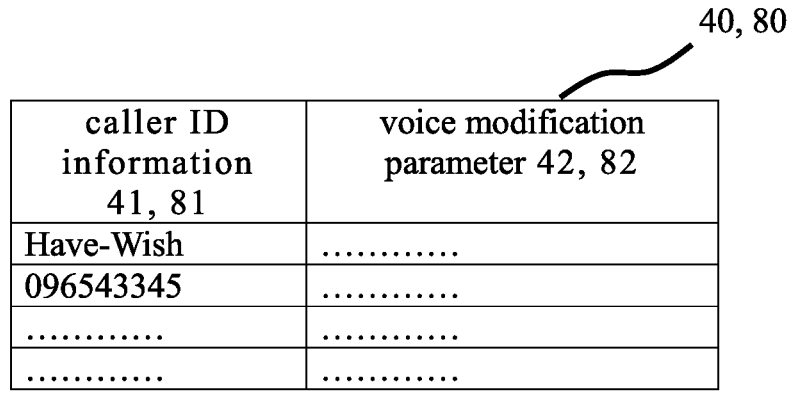
FIG. 3 is a schematic drawing of a voice modification parameter database.
Figure 4:
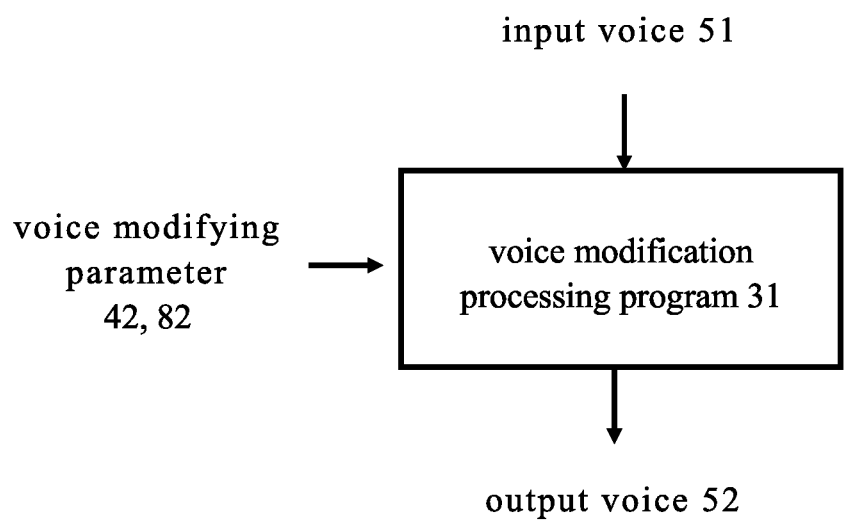
FIG. 4 is a schematic drawing illustrating that the voice modification processing program processes the input voice.

Please refer to FIG. 2, which is a flow chart according to the present invention, wherein the receiver is a hearing-impaired people, and refer also to FIG. 1, FIG. 3, and FIG. 4.

Step 201: receiving a receiver's caller ID information.

The caller makes a phone call to the receiver through the electronic device with telephone function 1. A user has to enter the receiver's caller ID information, such as telephone number, name (or nickname), or contact member name for Internet phone.

Step 202: Obtaining a voice modification parameter 42 or voice modification parameter 82 corresponding to receiver's caller ID information. There are two methods for obtaining the voice modification parameter 42, 82 of the receiver, which are illustrated as follows:

The first method is to obtain the voice modification parameter 42, 82 from the voice modification parameter database 40 of the electronic device with telephone function 1.

After the communication software 30 obtains the receiver's caller ID information in Step 201, the voice modification parameter 42, 82 can be obtained through searching the voice modification parameter database 40. The voice modification parameter database 40 has one column for recording the caller ID information 41 and another column for recording the voice modification parameter 42. In general, the voice modification parameter database 40 stores receivers' information that has been recorded by the user.

The voice modification parameter 42 can be obtained by the receiver directly transmitting it to the electronic device with telephone function 1, or the voice modification parameter 42 can be downloaded from the voice modification parameter service server 70 via the Internet 90. The voice modification parameter service server 70 also stores the voice modification parameter database 80. Please refer to FIG. 3, which shows two columns in the voice modification parameter database 80 for storing the caller ID information 81 and the voice modification parameter 82.

In general, the voice modification parameter database 80 has stored the voice modification parameters of all the hearing-impaired people who have registered with this service. However, the voice modification parameter database 40 only stores information of the receivers that the user already knows. When the information in the modification parameter database 80 is modified, for example, the voice modification parameter of the receiver A stored in the voice modification parameter database 80 is modified, and the voice modification parameter of the receiver A stored in the voice modification parameter database 40 will be modified accordingly.

The voice modification parameter of the receiver can be obtained through some hearing ability tests. For example, the hearing-impaired person can access to the voice modification parameter service server 70 via computer network and then take a hearing ability test to determine the voice modification parameter 82 of the hearing-impaired person. The voice modification parameter 82 is a piece of information related to an amplification parameter, a hearing ability parameter (such as a hearing ability parameter of a hearing-impaired person), or a frequency modulation parameter (such as a compression frequency parameter or a frequency modulation parameter). The method for controlling an output voice according to the voice modification parameter is a commonly known technology, so the details of the method are omitted here.

The second method is that the electronic device with telephone function 1 does not have to have the voice modification parameter database 40. After the communication software 30 obtains the receiver's caller ID information in Step 201, it accesses a parameter service server 70 via the Internet and searches the voice modification parameter database 80 to obtain a voice modification parameter 82. For example, the electronic device with telephone function 1 transmits the receiver's caller ID information to the voice modification parameter service server 70 to facilitating the search for the voice modification parameter 82 corresponding to the receiver.

Step 203: receiving an input voice 51. The electronic device with telephone function 1 receives a voice from the user. Please refer to FIG. 4.

Step 204: transforming the input voice 51 into an output voice 52 by a voice modification processing program 60, wherein the voice modification processing program 60 modifies the input voice 51 according to the voice modification parameter 42 or the voice modification parameter 82. The voice modification processing program 60 it one often employed in hearing aids, for instance, for shifting high-frequency voices or for amplifying some high-frequency sounds.

Step 205: outputting the output voice 52 to the electronic device with telephone function 1a of the receiver.

It is noted that the Internet 90 in this specification can comprise one or more than one type of network, such as the Internet, telecommunications network, or Wi-Fi. The Internet 90 is not a major improvement of the present invention; therefore, the Internet 90 is chosen as an illustrating example.

Figure 5:
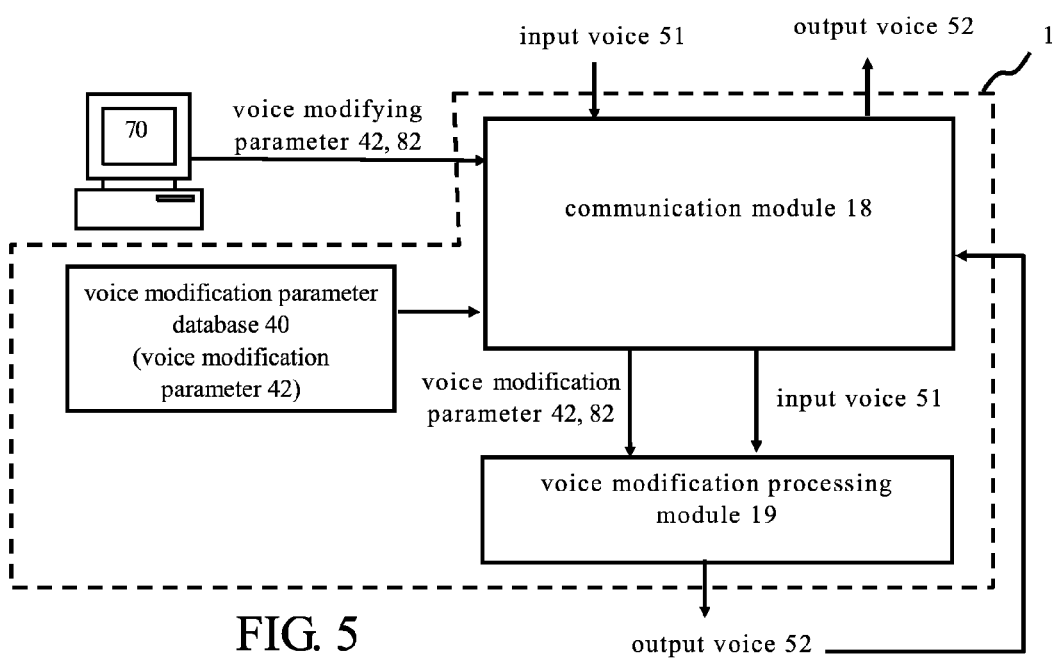
FIG. 5 is a block diagram of the electronic device with telephone function.

Please refer to FIG. 5; in the present invention, the electronic device with telephone function 1 can be presented as two major modules (software combined with hardware): the communication module 18 and the voice modification processing module 19. In addition, as mentioned above, the voice modification parameter database 40 is not necessary for the electronic device with telephone function 1. The communication module 18 basically refers to functions of the processor 11, the microphone module 13, the speaker 14, the voice signal communication module 15, and the communication software 30. The voice modification processing module 19 basically refers to functions of the voice modification processing program 60 in the memory 12.

The communication module 18 is employed for receiving a receiver's caller ID information and obtaining the voice modification parameter 42 or the voice modification parameter 82 corresponding to the receiver according to the receiver's caller ID information. The communication module 18 also transmits the voice modification parameter 42 or the voice modification parameter 82 to the voice modification processing module 19.

As mentioned above, there are two methods for obtaining the voice modification parameter. One is to obtain it from the voice modification parameter database 40. The other method is that the communication module 18 transmits the receiver's caller ID information to a voice modification parameter service server 70 via an Internet 90, and then the voice modification parameter 82 is provided by the voice modification parameter service server 70 via the Internet 90.

After the communication module 18 receives the input voice 51, the input voice 51 is transmitted to the voice modification processing module 19. The voice modification processing module 19 receives and modifies the input voice 51 into an output voice 52 according to the voice modification parameter 42 or the voice modification parameter 82, and then the output voice 52 is outputted. The voice modification processing module 19 transmits the output voice 52 to the communication module 18, and then the communication module 18 outputs the output voice 52 afterwards.

Figure 6:
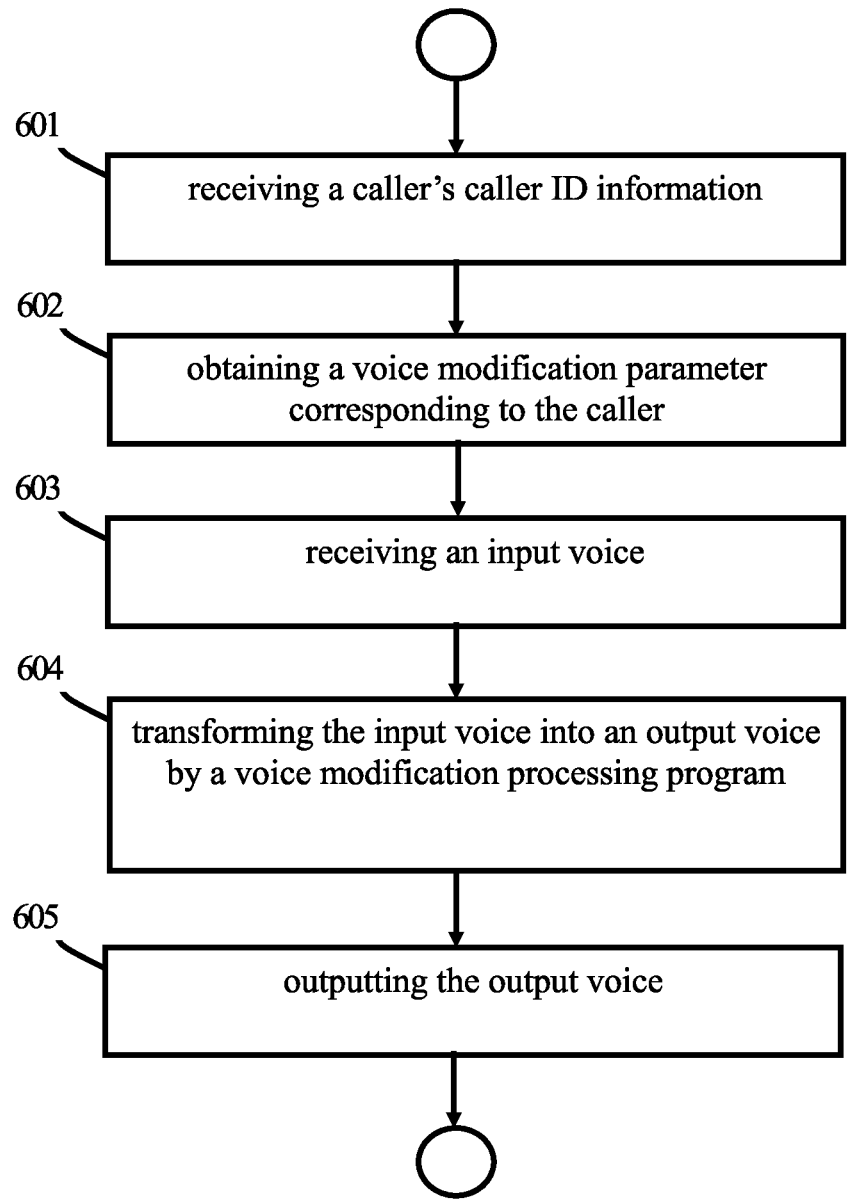
FIG. 6 is a flow chart according to the present invention, wherein the caller is a hearing-impaired person.

The embodiment above assumes that the receiver is a person with hearing problems such as a hearing-impaired person or an elderly person. When the hearing-impaired person makes a phone call through the electronic device with telephone function 1*a* to a receive a call from someone who has the electronic device with telephone function 1, the electronic device with telephone function 1 implements the above presented steps to obtain the voice modification parameter of the caller. Thus, voices from the receiver, who has the electronic device with telephone function 1, can be transmitted to the caller, who has electronic device with telephone function 1*a*, after modification. Please refer to FIG. 6.

Step 601: receiving a caller's caller ID information

When the caller makes a phone call via an electronic device with telephone function 1*a* to a receiver who has an electronic device with telephone function 1, the caller's caller ID information is identified immediately by the telecommunications equipment or by the Internet phone service server. Therefore, the caller's caller ID information can be transmitted to the electronic device with telephone function 1 or the voice modification parameter service server 70.

Step 602: obtaining a voice modification parameter 42 or the voice modification parameter 82 according to the caller's caller ID information. Methods for obtaining the voice modification parameter 42 or the voice modification parameter 82 corresponding to the caller have been presented in Step 202; thus, the related description is omitted here.

The descriptions of Step 602 to Step 605 are same as those of Step 202 to Step 205; thus, the related description is omitted here.

In addition, when both the caller and the receiver are hearing-impaired people, the caller's voice or the receiver's voice can be modified by the electronic device with telephone function 1 and by the electronic device with telephone function 1*a* according to the voice modification parameter corresponding to the caller or the voice modification parameter corresponding to the receiver.

When neither the caller nor the receiver is a hearing-impaired person or either the caller or the receiver is a hearing-impaired person who has yet to register a voice modification parameter, then no voice-modifying process takes place in the electronic device with telephone function 1 and the electronic device with telephone function 1*a*.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A telephone voice output method applied to an electronic device having a telephone function comprising the following steps:
    receiving a receiver's caller ID information or a caller's caller ID information;
    obtaining a voice modification parameter corresponding to the receiver or the caller according to the receiver's caller ID information or the caller's caller ID information;
    receiving an input voice;
    transforming the input voice into an output voice by a voice modification processing program, wherein the input voice is modified by the voice modification processing program according to the voice modification parameter; and
    outputting the output voice.

2. The telephone voice output method as claimed in claim 1, wherein the voice modification parameter records a sound amplifying parameter, a hearing ability parameter, or a frequency modulation parameter.

3. The telephone voice output method as claimed in claim 2 further comprising: transmitting the receiver's caller ID information or the caller's caller ID information to a voice modification parameter service server via an Internet, such that the voice modification parameter is provided by the voice modification parameter service server via the Internet.

4. An electronic device with telephone function comprising: a processor, a memory, a microphone module, a speaker, and a voice signal communication module, wherein the memory, the microphone module, the speaker, and the voice signal communication module are electronically connected with the processor, the memory stores a software program, and the processor implements the software program for executing the following steps:
    receiving a receiver's caller ID information or a caller's caller ID information;
    obtaining a voice modification parameter corresponding to the receiver or the caller according to the receiver's caller ID information or the caller's caller ID information;
    receiving an input voice;
    transforming the input voice into an output voice by a voice modification processing program, wherein the input voice is modified by the voice modification processing program according to the voice modification parameter; and
    outputting the output voice.

5. The electronic device with telephone function as claimed in claim 4, wherein the voice modification parameter records a sound amplifying parameter, a hearing ability parameter, or a frequency modulation parameter.

6. The electronic device with telephone function as claimed in claim 5, wherein after the processor implements the software program, the electronic device with telephone function further executes: transmitting the receiver's caller ID information or the caller's caller ID information to a voice modification parameter service server via an Internet, such that the voice modification parameter is provided by the voice modification parameter service server via the Internet.

* * * * *